Figure 1:
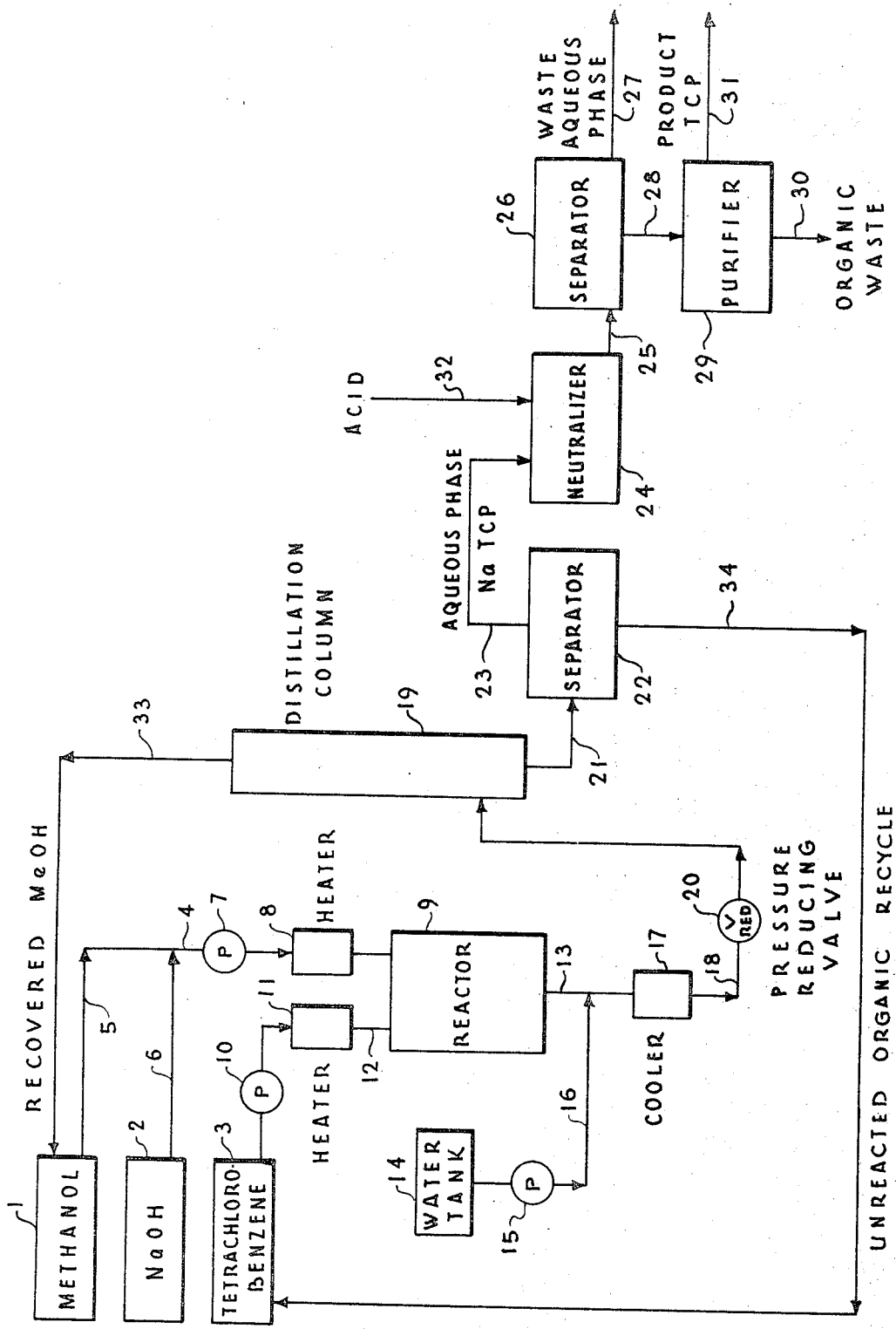

though conditions and requirements might warrant applying the heat directly to the reactor. The pressure in the reactor is maintained in excess of at least the autogenous pressure of the reaction mixture at the reactor temperature by use of a discharge pressure control valve.

United States Patent Office 3,347,937
Patented Oct. 17, 1967

3,347,937
CONTINUOUS PROCESS FOR MANUFACTURE OF TRIHALOPHENOLS
Charles H. Carr, Grand Island, and Joy E. Beanblossom, Niagara Falls, N.Y., assignors to Hooker Chemical Corporation, Niagara Falls, N.Y., a corporation of New York
Filed June 4, 1965, Ser. No. 461,319
4 Claims. (Cl. 260—623)

This is a continuation-in-part of our application Ser. No. 72,634, filed November 30, 1960, now forfeited, which is a continuation-in-part of application Ser. No. 774,492, filed November 17, 1958, now abandoned.

This invention relates to a system for the production of trichlorinated phenols.

More specifically the concept of this invention resides in a practical continuous process for the caustic hydrolysis of tetrachlorobenzenes to polychlorophenols. Under the specifics of this invention, optimum conversion of the reactants to high purity trichlorophenol is obtained, and unreacted organic material is separated and recycled to obtain substantially quantitative yields.

The main reactions which take place during a specific application of the process of this invention are as follows:

(1) 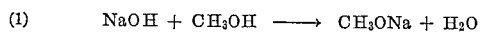

(2) 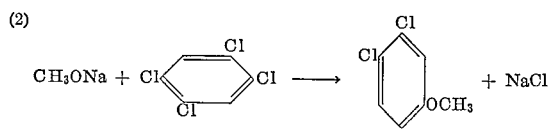

(3) 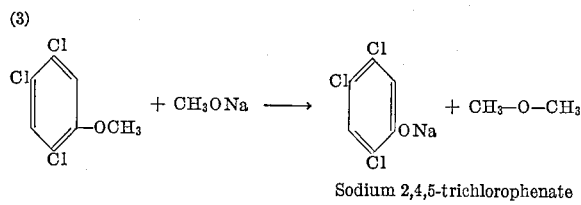

Sodium 2,4,5-trichlorophenate

There are also by-products formed which can reduce the yield of the process.

In the preferred process of this invention, liquid tetrachlorobenzene and a solution of sodium hydroxide in methanol are independently fed to an agitated reactor having a series or plurality of reaction zones. The individual feed streams are preheated before entering the reactor to control reaction temperature, although conditions and requirements might warrant applying the heat directly to the reactor. The pressure in the reactor is maintained in excess of at least the autogenous pressure of the reaction mixture at the reactor temperature by use of a discharge pressure control valve.

It is quite important to this invention that the total water added to the reaction mixture, including any water present in the feed materials, be kept within a critical range, defined elsewhere herein. This water addition dissolves alkali metal chloride formed, yet surprisingly does not cause precipitation of organics if kept within the critical range. It also aids in the cooling of the reaction mixture, and reduces operating difficulties appreciably.

After the addition of water, but before the reaction mixture passes into a distillation column, the mixture is cooled to the desired temperature. The mixture is cooled in order to reduce the vapor pressure of the mixture for subsequent processing and then the pressure is reduced. The alcohol is recovered by fractional distillation. Unreacted organic material insoluble in the resultant aqueous layer is separated and may be recycled for re-use in the reactor. The water layer is acidified and the trichlorophenol phase separated and purified.

The temperature at which the reaction zone can be maintained is between one hundred and seventy and two hundred and twenty degrees centigrade. The residence time is about from ten to sixty minutes. The mole ratios of the process reactants of this invention are: about one mole part tetrachlorobenzene, about from two to four mole parts alkali metal-hydroxide, about from six to one hundred mole parts alcohol. The pressure in the system before the pressure reducing valve is maintained above the autogenous pressure of the reaction mixture, that is, above the vapor pressure of methanol, to keep the reaction mixture in the liquid phase at reaction temperature. It is preferred that this pressure be about from fifty to two hundred p.s.i.g. above the autogenous pressure in order to allow for partial pressures of other materials in the reactor in addition to the alcohol. The system of this invention provides for reduction of the pressure from reactor pressure to atmospheric without plugging the control valve with alkali metal-chlorides or unreacted organic material. Also, the alcohol which is recycled is recovered without obtaining a dry residue of alkali metal-chlorophenates and alkali metal chlorides, which would be difficult to handle. The system further provides convenient control of the reaction so that optimum conversion to high purity trichlorophenol can be obtained per pass and unreacted organic material could be separated and recycled through the reactor to obtain higher yields.

It is one object of this invention to provide a continuous process for the caustic hydrolysis of tetrachlorobenzenes to trichlorophenols.

It is another object of this invention to use a production system which contains a multi-stage reactor which will insure uniform mixing of the feed material and reduction of operational difficulties due to plugging of the reactor. In the prior art, the continuous processes for the production of polychlorophenol have utilized a coil type reactor. In using the coil type reactors of the prior art, it was found that many operational difficulties were encountered. A few of these difficulties were plugging of the reactor system with solid alkali metal chlorides, plugging of the reactor system with unreacted organic material, variation of product quality due to non-uniformity of reaction mixture and a variation of reaction time due to the above-mentioned formation of solid materials. It is important to this invention that a multi-zone agitator-type reactor be used.

It is a further object of this invention to utilize a process containing a feed system which avoids the necessity of large high pressure feed tanks and problems associated with trying to continuously and uniformly feed a slurry of tetrachlorobenzene in alcoholic caustic solution.

Other objects will become apparent upon a further reading of this disclosure.

Figure 2:
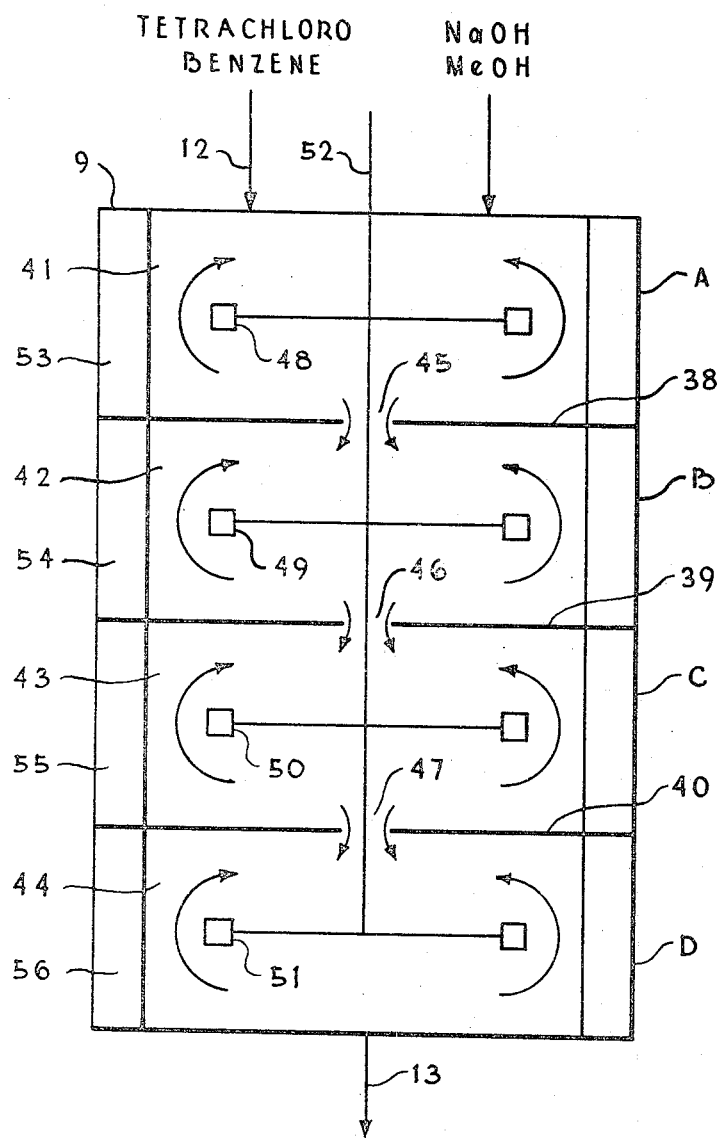
Figure 3:
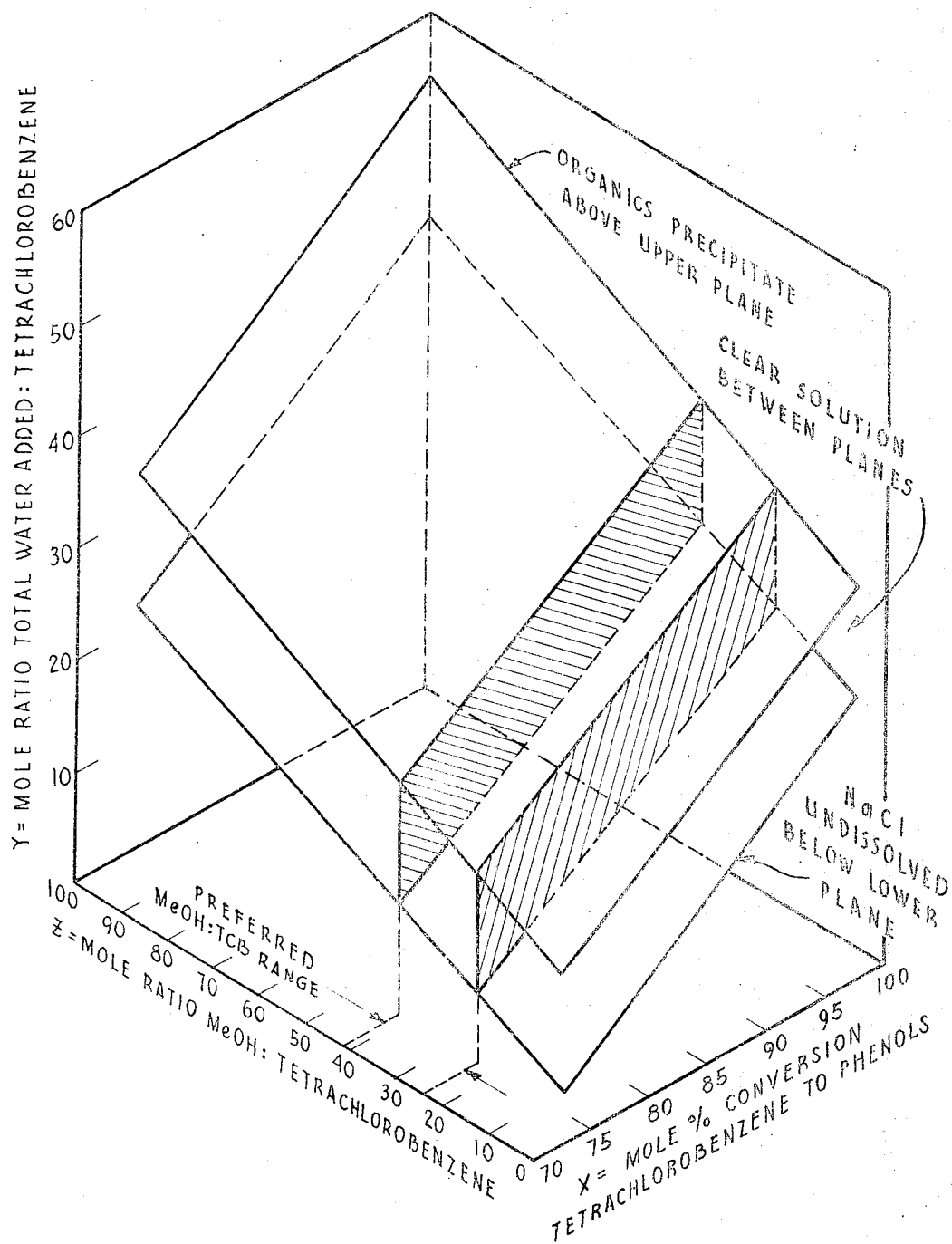

In order that the invention be more easily understood, it will be described with reference to the attached drawings. FIGURE 1 is a flow-sheet of an embodiment of the process of this invention. FIGURE 2 is a schematic view of the multi-zone agitated reactor means for effecting the reaction of this invention. And FIGURE 3 is an isometric graph showing the critical operating zone of water addition to the reaction mixture.

Referring to FIGURE 1, methanol, sodium hydroxide, and tetrachlorobenzene are fed to the multi-zone reactor 9 from storage tanks 1, 2, and 3, respectively. Methanol and sodium hydroxide are fed into combined feed line 4 from lines 5 and 6. Methanol caustic solution is fed from line 4 into pump 7, which forces said solution through heater 8, into reactor 9. We have found that preferred results were obtained by using a mixing tank at a point between pump 7 and storage tanks 1 and 2. It would also not depart from the spirit of the invention to run feed lines 5 and 6 directly from storage tanks 1 and 2 into reactor 9, rather than directing lines 5 and 6 into a combined feed line 4, as illustrated in the drawing. In the event that lines 5 and 6 are fed directly into reactor 9, it would be necessary to utilize pumps on each feed line.

The reaction mixture which leaves reactor 9 (consists of a methanol solution of sodium chlorophenate, excess caustic, and unreacted organic materials, together with solid sodium chloride held in suspension), then passes into reactor discharge line 13. Water from feed tank 14 is fed in a critical amount through pump 15 into water line 16, and from there into line 13. In line 13 the water dissolves the solid sodium chloride. This is critical because it eliminates problems associated with plugging in the cooling lines and the pressure reducing valve. Salt is to be dissolved, yet precipitation of organics if too much water is present, is to be avoided. The addition of water at line 16 also serves to keep the product sodium chlorophenate in solution once the MeOH is removed in still 19. The resulting mixture is then passed into cooler 17. The temperature of this mixture when it enters cooler 17 is about one hundred and fifty to two hundred degrees centigrade and leaves cooler 17 at about twenty-five to eighty degrees centigrade. From cooler 17, this cooled mixture passes into line 18 through pressure reducing valve 20. The valve 20 reduces the pressure in the system to about atmospheric or zero p.s.i.g. The mixture passes through line 18 into distillation column 19. At this point, methanol is recovered by fractional distillation and recycled to methanol storage tank 1 through line 33 for re-use. Remaining in the distillation column 19 is an aqueous phase containing sodium chlorophenate, sodium chloride and excess caustic, and an organic phase consisting of unreacted organic material. This mixture passes through distillation discharge line 21 into separator 22. Here, the mixture is separated into an aqueous phase and an organic phase, which passes out of the separator 22 into line 34 where it is recycled to tetrachlorobenzene storage tank 3. The aqueous phase containing the sodium chlorophenate passes through line 23 into neutralizer 24 where it is neutralized with acid fed through line 32. The acid converts the sodium chlorophenate to trichlorophenol. In the neutralizer, two phases are formed; an aqueous phase and an organic phase which comprises the trichlorophenol. The two-phase mixture passes through discharge line 25 to separator 26. Here, the aqueous phase containing excess caustic and sodium chloride is withdrawn and discarded through line 27. The organic phase (crude trichlorophenol phase), is withdrawn through separator discharge line 28, and passes to the purifier 29. Here, the crude product is purified to the desired specifications. The organic waste is drawn off from the purifier by line 30, the product drawn off through line 31.

We have found that a better overall yield can be obtained by operating with lower conversions, and recycling more unreacted and intermediate reaction materials than by attempting to obtain higher conversion. Also, the product trichlorophenol is of a higher purity and the purification steps themselves of the process as described herein, are of a considerably simpler and more economical nature than could otherwise be required.

The equipment used is quite important to the concept of this invention. The pumps shown in FIGURE 1 are high pressure positive displacement, variable flow rate metering pumps designed for pressure up to 1500 p.s.i.a. The reactor shown in FIGURE 1 is an agitated tank-type multi-zone reactor consisting of several stages separated by horizontal baffles with a high speed agitator in each stage. This reactor has vertical baffles to aid in more complete mixing. The direction of flow through the reactor may be varied, depending upon the requirements at the time of operation. The reactor must be well insulated but not necessarily jacketed. It is designed for 1500 p.s.i.a. internal pressure. The cooler is a water cooled tubular heat exchanger designed for 1500 p.s.i.a. The pressure reducing valve is an automatic pressure control valve set to open when the pressure exceeds the desired pressure and to close when the pressure decreases below the desired pressure. The distillation column is a continuous fractionating column designed to give the required separation between methanol and water. The separators cause separation of an aqueous liquid phase from a solid or liquid organic phase. A decanter, centrifuge or filter may be used. The neutralizer is a continuous, agitated tank-type controlled by pH of effluent. The purification step may be accomplished by fractional distillation or other standard methods of purification such as crystallization, extraction, etc.

In accordance with this invention, the process is carried out through a series of reaction zones. Each of these zones is partitioned or separated from the next zone of reaction by baffle or other means. We have found that if the reaction is carried out in a single stage or batch type reactor, the reactor would have to be approximately ten times the working volume of an equivalent continuous reactor, because of the time required in charging, heating, cooling and discharging the materials. The larger equipment and more complicated design for pressure equipment would substantially increase plant investments. With a coil-type continuous reactor, the problem of plugging with sodium chloride seriously limits its applicability, even though it theoretically has an infinite number of zones or stages, and could thereby provide the shortest theoretical reaction times. We have found that a four-zone continuous reactor having means for agitation in each zone, is the most desirable to use in this process from the standpoint of achieving minimum residence time for a given conversion, minimized plugging problems and low equipment costs.

Thus, each stage of the reactor means comprises a separate agitated zone of reaction, wherein the materials from a previous zone are fed continuously into a next adjacent agitated zone.

This is further depicted in FIGURE 2, wherein the reactor 9 of FIGURE 1 is shown in schematic cross-section. The reactor is divided into four stages: A, B, C and D, by three horizontal baffles 38, 39 and 40, respectively, and each stage containing its corresponding reaction zone 41, 42, 43 and 44, respectively. Zone A is in communication with Zone B at opening 45. Zone B is in communication with Zone C at opening 46, and Zone C is in communication with Zone D at opening 47. Each zone has its own agitation means 48, 49, 50 and 51, respectively, which are connected to a central power-driven rotating shaft 52. Each stage also has vertical baffles 53, 54, 55 and 56. Thus, in each zone there is agitation means provided to obtain a circulation and fluid movement as indicated by the arrows therein.

We prefer to use a four-zone reaction system. If two zones are used, the residence time to obtain a given conversion would be increased by approximately fifty percent over a four zone system. If a five-zone reaction system were used to obtain the same conversion, the residence time would be decreased by only about five percent over a four-zone system, and mechanical difficulties would be increased somewhat. As many as ten zones may be used, however, either in one reactor means or in more than one reactor means in series.

Also when fewer than four zones are used, there is an increase in undesirable back mixing, which in turn results in higher amounts of by-product formation. If more than four zones are used, the decrease in back mixing is too small to warrant the added investment and equipment complexity.

The preferred embodiment of the invention is illustrated by the following example:

*Example 1*

Seventy-three percent aqueous NaOH and methanol of ninety-eight to one hundred percent purity are mixed together to obtain a methanolic caustic soda solution containing eight to twelve percent NaOH by weight. Molten 1,2,4,5-tetrachlorobenzene and the methanolic caustic soda solution are pumped independently into the agitated, multi-stage reactor at eight hundred p.s.i.g. The feed streams are preheated sufficiently to obtain a reactor temperature of one hundred and ninety to two hundred and ten degrees centigrade. The feed rates are adjusted to give substantially a 3:1 mole ratio of NaOH to tetrachlorobenzene and residence time of fifteen to thirty minutes. Sufficient water is added to the reactor effluent to dissolve all of the NaCl formed in the reactor, the mixture is cooled to sixty to seventy degrees centigrade and the pressure reduced to about one atmosphere. Methanol of ninety-eight to one hundred percent purity is recovered by fractional distillation. Unreacted organic material amounting to five to fifteen percent of the tetrachlorobenzene feed is separated and recycled to the reactor. The aqueous phase is acidified with anhydrous HCl, the phenol phase is separated and purified by fractional distillation under vacuum.

Using this procedure, conversion of tetrachlorobenzene to phenols is over eighty-five percent per pass through the reactor. The yield of distilled 2,4,5-trichlorophenol having a melting point about 64.5 degrees centigrade is at least eighty-five percent of the theoretical yield.

Table I indicates eight separate runs that were performed under varied conditions, including Example 1.

and cut down the efficiency of the cooling and otherwise plug the equipment.

We have found that the total amount of water added to the reaction mixture is related to the percent tetrachlorobenzene converted to phenols and the mole ratio of methanol to tetrachlorobenzene in the feed, as is shown in Table II, and graphically in FIGURE 3, where the mole ratio of "the total water added" to tetrachlorobenzene fed is plotted vertically as Y, and where the mole ratio of methanol to tetrachlorobenzene fed, Z, and the mole percent conversion of tetrachlorobenzene to phenol, X, plotted as the ordinates of the horizontal plane in the isometric graph. This graph shows two planes defining a region in which the operation of the claimed invention can be carried out without the precipitation of salt or organics.

By our use of "total water added" to the reaction mixture, we mean the total of the water which may be added with the feed materials plus the water which is added to the reaction mixture at or near the end of the reaction period. We do not mean to include in this term any water which is formed during the reaction, such as is illustrated in Equation 1.

If we let $Y_1$, denote the minimum amount of added water required to dissolve the salt, $Y_2$ denote the maximum amount of water which can be added before organics precipitate, and if we express values of Y in terms of mole ratios of "total water added" to tetrachlorobenzene fed, the critical range of water to be added, then Y must have a value between $Y_1$ and $Y_2$. Thus:

(4) $$Y_1 \leq Y \leq Y_2$$

The operating range for Y can be determined by using the following equations for $Y_1$ and $Y_2$, which define the two planes shown graphically in FIGURE 3:

(5) $$Y_1 = 0.8184X + 0.2136Z - 60.48$$
(6) $$Y_2 = 0.8184X + 0.2448Z - 51.36$$

where $Y_1$ and $Y_2$ are the limiting values of the mole ratio of total water added in the process (including that added with the feed materials) per mole of tetrachlorobenzene fed, X is the mole percent conversion of the tetrachlorobenzene to phenols in the reaction and limited to TABLE I.—RUNS OF CONTINOUS MeOH PROCESS FOR TRICHLOROPHENOL

[Basis: 1 mole of tetrachlorobenzene (216 weight parts)]

| Run No. | Moles of Methanol | Moles of NaOH | Temp., (° C.) | Residence Time (Min.) | Conversion (Mole percent) | M.P. of Crude TCP |
|---|---|---|---|---|---|---|
| 1 | 36.4 | 3.2 | 200 | 23 | 88 | 61 |
| 2 | 33.0 | 2.9 | 208 | 19 | 91 | 60 |
| 3 | 19.6 | 2.8 | 206 | 21 | 90 | 57 |
| 4 | 19.6 | 2.8 | 215 | 18 | 93 | 55 |
| 5 | 71.1 | 3.0 | 206 | 18 | 67 | 61 |
| 6 | 66.5 | 2.8 | 213 | 17 | 82 | 60 |
| 7 | 42.5 | 3.8 | 202 | 20 | 92 | 58 |
| 8 | 41.8 | 3.7 | 210 | 19 | 97 | 57 |

Runs 1 and 2 under the above conditions are preferred because as shown above the conversion is high and the purity of the crude trichlorophenol is also high, as indicated by the melting point.

As stated above, the amount of water to be added to the reaction mixture is critical. If too little water is added, sodium chloride remains undissolved and tends to collect on the cooling coils cutting down the heat transfer efficiency, and otherwise plugging the equipment. If too much water is added, organics such as tetrachlorobenzene and trichloroanisole tend to precipitate as an oily sludge the range of from about 75 percent to about 100 percent conversion, and Z is the mole ratio of methanol to tetrachlorobenzene fed and limited to where the methanol values are between about six and about one hundred mole parts per mole part of tetrachlorobenzene fed. From the use of these limiting Equations 5 and 6 for $Y_1$ and $Y_2$, respectively, the operating range from Y can be determined for the claimed continuous process.

These and other findings are further illustrated by the examples shown in Table II on which the above equations are based in part.

TABLE II.—ADDITION OF WATER TO REACTION PRODUCT AS FUNCTION OF CONVERSION

| Run No. | Mole Ratio MeOH/TCB | Mole percent Conversion TCB→Phenols | Mole Ratio [1] Total H₂O Added/TCB | Condition of Product |
|---|---|---|---|---|
| 9 | 28.8 | 87.3 | 15.5 | Undissolved NaCl. |
| 10 | 33.3 | 96.0 | 23.5 | Do. |
| 11 | 37.5 | 99.3 | 25.8 | Do. |
| 12 | 16.7 | 87.2 | 29.8 | Organics Precipitate. |
| 13 | 20.6 | 95.4 | 36.7 | Do. |
| 14 | 32.8 | 72.0 | 19.0 | Do. |
| 15 | 33.8 | 92.9 | 33.6 | Do. |
| 16 | 36.2 | 88.8 | 31.8 | Do. |
| 17 | 42.5 | 95.8 | 37.4 | Do. |
| 18 | 64.1 | 75.1 | 26.4 | Do. |
| 19 | 34.7 | 99.6 | 34.6 | Clear. |
| 20 | 34.9 | 96.0 | 24.0 | Do. |
| 21 | 36.5 | 85.3 | 21.1 | Do. |
| 22 | 39.8 | 92.8 | 27.4 | Do. |
| 23 | 66.9 | 95.1 | 32.0 | Do. |
| 24 | 69.6 | 83.8 | 29.9 | Do. |

[1] Total Water Added=Water in Feed plus Water Added After Reaction. (Does not include H₂O Formed in Reaction.)

The water supplied at the end of the reaction period can be added to the stream exiting from the reactor, as is illustrated in FIGURE 1, or it can be added directly into one or more of the final reaction zones in the reaction, i.e. at a point after the first reaction zone.

In FIGURE 3, the region between the two shaded vertical planes denotes the preferred of mole ratio range of methanol to tetrachlorobenzene, as illustrated in Example 1.

The examples of our invention and methods which have been described in the foregoing specification have been given for purposes of illustration, not limitation. Existing conditions might necessitate the use of a lower alcohol having one to six carbon atoms, in addition to methanol, for example, ethanol, propanol, ethylene glycol, butanol, propylene glycol, etc. Among the tetrachlorobenzenes which may be utilized in this invention are 1,2,4,5-tetrachlorobenzene, 1,2,3,4-tetrachlorobenzenes, 1,2,3,5-tetrachlorobenzenes, and mixtures of these. And among the alkali metal hydroxides which can be used are sodium hydroxide, potassium hydroxide and mixtures thereof. Many other modifications and ramifications will naturally suggest themselves to those skilled in the art, based on the disclosure of our basic discovery. These are intended to be comprehended within the scope of our invention.

What is claimed is:

1. A continuous process for the production of trichlorophenol which comprises: passing preheated reactants comprising alkali metal hydroxide, methanol and a separate stream of tetrachlorobenzene in the mole ratio of one part tetrachlorobenzene, one to four parts alkali metal hydroxide and six to 100 parts methanol, through a series of reaction zones, while maintaining each of said reaction zones under agitation at a temperature of from about 170 degrees centigrade to about 220 degrees centigrade and at a pressure above the autogenous pressure of the reacting mixture and below about 1500 pounds per square inch absolute for a residence time up to about 60 minutes, so that there is a conversion to a reaction mixture comprising crude trichlorophenol material in the form of alkali metal trichlorophenate, alkali metal chloride and organics, adding water to the said reaction mixture at a point after the first reaction zone in an amount sufficient to dissolve a substantial amount of alkali metal chloride in said mixture but insufficient to precipitate the organics, the total amount of water being added in the process being defined as in the range between the limiting values of $Y_1$ and $Y_2$ whose equations are:

$$Y_1 = 0.8184X + 0.2136Z - 60.48$$
$$Y_2 = 0.8184X + 0.2448Z - 51.36$$

where $Y_1$ and $Y_2$ are the limiting mole ratios of total water added in the process per mole of tetrachlorobenzene fed, X is the mole percent conversion of the tetrachlorobenzene to phenols in the reaction and limited to the range of from about 75 to about 100 mole percent conversion, and Z is the mole ratio of methanol to tetrachlorobenzene fed and limited to values between about six and about 100 mole parts methanol per mole part of tetrachlorobenzene fed, and recovering the trichlorophenol material therefrom.

2. The process of claim 1 wherein the tetrachlorobenzene fed is 1,2,4,5-tetrachlorobenzene, the alkali metal hydroxide is sodium hydroxide and the trichlorophenol product formed comprises 2,4,5-trichlorophenol.

3. A continuous process for the production of trichlorophenol which comprises: passing a preheated first stream comprising tetrachlorobenzene and a separate second stream comprising sodium hydroxide and methanol into a four-stage reaction zone in the mole ratio of one part tetrachlorobenzene, one to four parts sodium hydroxide and six to one hundred parts methanol; maintaining said reaction zone at a temperature from one hundred and seventy degrees centigrade to two hundred and twenty degrees centigrade and at a pressure between three hundred and eleven hundred pounds per square inch gauge for a time between about ten and sixty minutes; maintaining the reaction mixture under agitation in each of said stages of said zone while it is passing from stage to stage through said zone, discharging the reaction mixture from the reactor; adding water to the discharged mixture in an amount sufficient to dissolve a substantial amount of sodium chloride in said mixture; said amount being defined as in the range between the limiting values of $Y_1$ and $Y_2$ whose equations are:

$$Y_1 = 0.8184X + 0.2136Z - 60.48$$
$$Y_2 = 0.8184X + 0.2448Z - 51.36$$

wherein $Y_1$ and $Y_2$ are the limiting mole ratios of total water added in the process per mole of tetrachlorobenzene fed, X is the mole percent conversion of the tetrachlorobenzene to phenols in the reaction and limited to the range of from about 75 to about 100 mole percent conversion, and Z is the mole ratio of methanol to tetrachlorobenzene fed and limited to values between about six and about 100 mole parts methanol per mole part of tetrachlorobenzene fed; reducing the pressure on said reaction mixture to substantially atmospheric pressure; passing said mixture into a distillation column wherein the methanol is distilled overhead and recycled for use as feed to the reactor; withdrawing the bottoms from said column; separating said bottoms into an aqueous and organic phase; recycling the organic phase for use as feed to the reactors; neutralizing said aqueous phase with an acid and drawing off the trichlorophenol product formed.

4. The process of claim 3 wherein the first stream consists essentially of 1,2,4,5-tetrachlorobenzene and the trichlorophenol product formed consists essentially of 2,4,5-trichlorophenol.

References Cited

FOREIGN PATENTS 150,409  3/1953  Australia.

LEON ZITVER, *Primary Examiner.*

W. B. LONE, *Assistant Examiner.*

UNITED STATES PATENT OFFICE
CERTIFICATE OF CORRECTION

Patent No. 3,347,937 October 17, 1967

Charles H. Carr et al.

It is certified that error appears in the above identified patent and that said Letters Patent are hereby corrected as shown below:

Column 7, line 7, "23.5" should read -- 23.6 --; line 17, "96.0" should read -- 90.6 --.

Signed and sealed this 17th day of March 1970.

(SEAL)
Attest:

Edward M. Fletcher, Jr.          WILLIAM E. SCHUYLER, JR.
Attesting Officer                    Commissioner of Patents